(12) United States Patent  
Taira

(10) Patent No.: US 11,146,134 B2  
(45) Date of Patent: Oct. 12, 2021

(54) INSULATING STRUCTURE OF VENTILATION PATH OF SALIENT-POLE ROTOR

(71) Applicant: MEIDENSHA CORPORATION, Tokyo (JP)

(72) Inventor: Kenichi Taira, Ota (JP)

(73) Assignee: MEIDENSHA CORPORATION, Tokyo (JP)

(*) Notice: Subject to any disclaimer, the term of this patent is extended or adjusted under 35 U.S.C. 154(b) by 161 days.

(21) Appl. No.: 16/491,314

(22) PCT Filed: Mar. 5, 2018

(86) PCT No.: PCT/JP2018/008214  
§ 371 (c)(1),  
(2) Date: Sep. 5, 2019

(87) PCT Pub. No.: WO2018/164024  
PCT Pub. Date: Sep. 13, 2018

(65) Prior Publication Data  
US 2020/0021156 A1    Jan. 16, 2020

(30) Foreign Application Priority Data

Mar. 6, 2017 (JP) .............................. JP2017-042208

(51) Int. Cl.  
*H02K 3/24* (2006.01)  
*H02K 1/32* (2006.01)  
(Continued)

(52) U.S. Cl.  
CPC ............. *H02K 1/325* (2013.01); *H02K 1/246* (2013.01); *H02K 3/325* (2013.01)

(58) Field of Classification Search  
CPC ............ H02K 1/24; H02K 3/32; H02K 1/325; H02K 3/325; H02K 1/246; H02K 1/26;  
(Continued)

(56) References Cited

U.S. PATENT DOCUMENTS 9,729,020 B2 * 8/2017 Pal ........................... H02K 3/24  
2003/0193256 A1 * 10/2003 Liebermann ............. H02K 9/22  
310/194

FOREIGN PATENT DOCUMENTS

JP    37-14902 Y1    6/1962  
JP    50-72903 U     6/1975  
(Continued)

*Primary Examiner* — Tran N Nguyen  
*Assistant Examiner* — Leda T Pham  
(74) *Attorney, Agent, or Firm* — Foley & Lardner LLP

(57) ABSTRACT

To cool field winding from its inner peripheral side and increase an insulation performance, salient-pole rotor (3) has rotor yoke (12) provided along rotation shaft (11), magnetic cores (13) protruding outward in radial direction from outer peripheral portion of rotor yoke (12) and arranged at regular intervals in circumferential direction, magnetic head (14) provided at radial direction outer side of magnetic core (13), and field winding (15) wound around outer peripheral surface of magnetic core (13) between rotor yoke (12) and magnetic head (14). And, insulating structure of ventilation path of salient-pole rotor (3) has ventilation groove (15a) opening to inner peripheral surface of field winding (15) and penetrating field winding (15) in radial direction, ventilation hole (14a) penetrating magnetic head (14) in radial direction and communicating with ventilation groove (15a), and stepped portion (15b) formed at portion, at magnetic head (14) side, of ventilation groove (15a).

3 Claims, 7 Drawing Sheets

(51) Int. Cl.
*H02K 1/24* (2006.01)
*H02K 3/32* (2006.01)

(58) Field of Classification Search
CPC .. H02K 9/08; H02K 3/52; H02K 1/02; H02K 2/28; H02K 3/18; H02K 3/527; H02K 9/22; H02K 19/02; H02K 19/38; H02K 9/19; H02K 9/02; H02K 2213/03
See application file for complete search history.

(56) References Cited

FOREIGN PATENT DOCUMENTS

| | | | |
|---|---|---|---|
| JP | 56-71451 | A | 6/1981 |
| JP | 57-133248 | U | 8/1982 |
| JP | 61-126753 | U | 8/1986 |
| JP | 2002-58188 | A | 2/2002 |
| JP | 2002-78262 | A | 3/2002 |
| JP | 2005-304244 | A | 10/2005 |
| JP | 2013-34325 | A | 2/2013 |
| JP | 2017-169432 | A | 9/2017 |

\* cited by examiner

INSULATING STRUCTURE OF VENTILATION PATH OF SALIENT-POLE ROTOR

TECHNICAL FIELD

The present invention relates to an insulating structure of a ventilation path of a salient-pole rotor, which is devised so as to increase an insulation performance while maintaining a high cooling effect of a field winding.

BACKGROUND ART

As a rotor of a rotary electric machine, there is known a salient-pole rotor having a plurality of magnetic poles at an outer periphery of the salient-pole rotor. At this salient-pole rotor, a plurality of magnetic cores each protruding outward in a radial direction are arranged at regular intervals in a circumferential direction, and a field winding is wound around an outer peripheral surface of each of these magnetic cores.

By applying an exciting current to the field winding, the salient-pole rotor on a rotary side rotates with respect to a stator on a stationary side with a magnetic field being generated at an inner side of the wound field winding. When the exciting current flows through the field winding, the field winding generates heat by the flow of the current.

Here, if temperature of the field winding becomes excessively high, there is a risk that an insulating layer of the field winding will be damaged or broken due to thermal degradation. Because of this, the rotary electric machine having the salient-pole rotor is configured so that the field winding undergoes cooling by blowing a cooling airflow between the circumferentially adjacent field windings in an axial direction or by applying the cooling airflow to each axial direction end surface of the field winding. However, in such a cooling structure, only an outer surface of the field winding is cooled, and thus it is not possible to adequately cool the field winding entirely including an inside of the field winding.

For this reason, a variety of related-art cooling structures of the salient-pole rotor, which by providing a ventilation path that penetrates the field winding in the radial direction then blowing the cooling airflow into this ventilation path, also directly apply the cooling airflow to an inner side of the field winding, have been provided. As such related-art cooling structures, they are disclosed in, for instance, Patent Document 1 and 2.

CITATION LIST

Patent Document

Patent Document 1: Japanese Unexamined Patent Application Publication No. 2002-058188
Patent Document 2: Japanese Unexamined Utility Model Application Publication No. 61-126753

SUMMARY OF THE INVENTION

Technical Problem

However, in the case where the ventilation path penetrating the field winding in the radial direction is provided at the field winding of the salient-pole rotor, there arises a problem of shortening a creepage insulation distance between the field winding that is a high potential member and a grounding part (such as a rotation shaft and a magnetic head) that is a ground potential member.

The present invention was made in view of the above problem. An object of the present invention is therefore to provide an insulating structure of the ventilation path of the salient-pole rotor which is capable of securing a long creepage insulation distance while having the ventilation path penetrating the field winding in the radial direction.

Solution to Problem

To solve the above problem, a salient-pole rotor includes: a rotor yoke provided along a rotation shaft; a plurality of magnetic cores protruding outward in a radial direction from an outer peripheral portion of the rotor yoke and arranged at regular intervals in a circumferential direction; a magnetic head provided at a radial direction outer side of the magnetic core; and a field winding wound around an outer peripheral surface of the magnetic core between the rotor yoke and the magnetic head. And, an insulating structure of a ventilation path of the salient-pole rotor comprises: a ventilation groove opening to an inner peripheral surface of the field winding and penetrating the field winding in the radial direction; a ventilation hole penetrating the magnetic head in the radial direction and communicating with the ventilation groove; and a stepped portion formed at a portion, at the magnetic head side, of the ventilation groove.

The insulating structure of the ventilation path of the salient-pole rotor further comprises: an insulating member interposed between the magnetic head and the field winding and having a cutting portion that communicates with the ventilation groove and the ventilation hole.

The insulating structure of the ventilation path of the salient-pole rotor further comprises: an insulation block fixed to the stepped port ion with the stepped portion filled with the insulation block and securing the communication between the ventilation groove and the ventilation hole.

Effects of Invention

According to the present invention, since the ventilation path is formed by the ventilation groove formed on the inner peripheral surface of the field winding and the ventilation hole formed at the magnetic head and the cooling airflow can flow in this ventilation path, the field winding can be cooled from its inner peripheral side. Further, since the stepped portion whose groove width and groove depth are greater than those of the ventilation groove is provided at the portion, at the magnetic head side, of the ventilation groove, a long creepage insulation distance can be secured by the groove width and the groove depth of the stepped portion, thereby improving reliability of insulation.

EMBODIMENTS FOR CARRYING OUT THE INVENTION

In the following description, an insulating structure of a ventilation path of a salient-pole rotor according to the present invention will be explained in detail on the basis of an embodiment.

Embodiments

The insulating structure of the ventilation path of the salient-pole rotor according to an embodiment of the present invention will be explained with reference to FIGS. 1 to 7.

Figure 1:
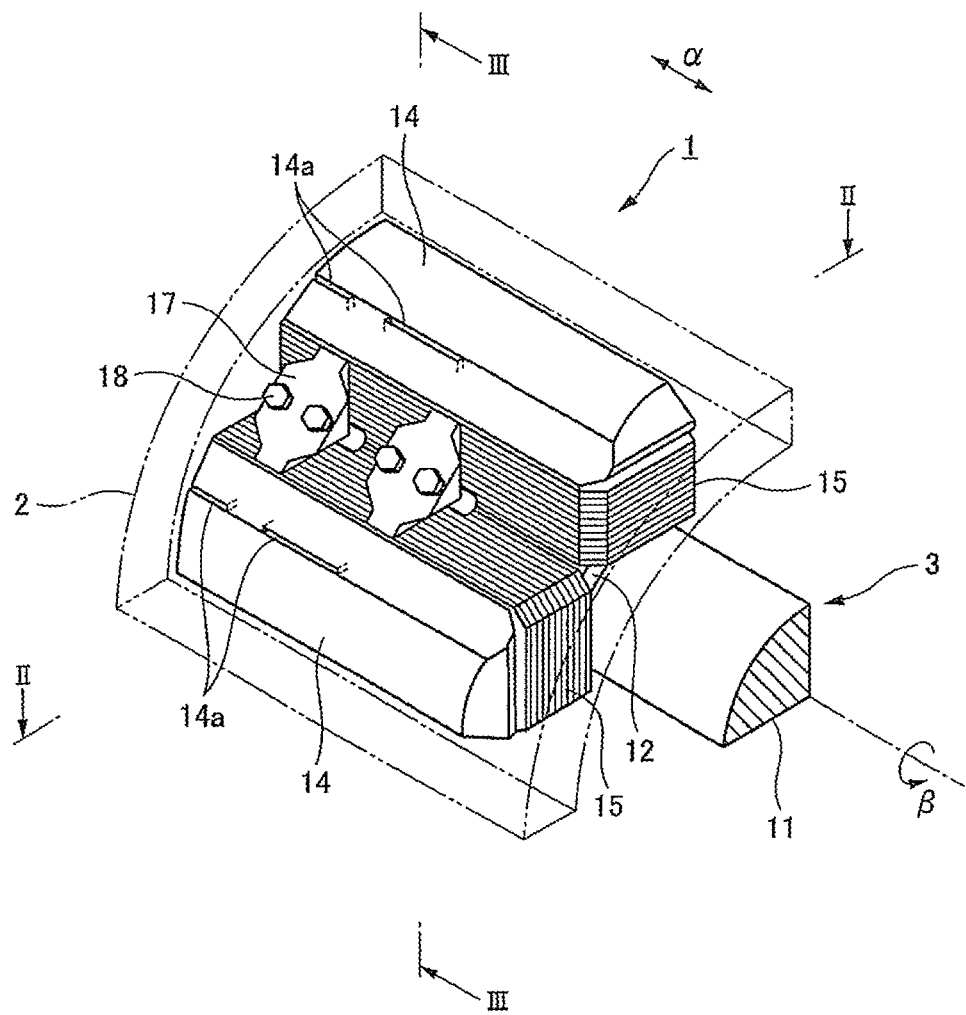
FIG. 1 is a perspective view showing an insulating structure of a ventilation path of a salient-pole rotor according to an embodiment of the present invention.

As shown in FIG. 1, a rotary electric machine 1 is formed from a stator 2 on a stationary side and a salient-pole rotor 3 on a rotary side. Here, FIG. 1 illustrates apart of the rotary electric machine 1 with the rotary electric machine 1 cut into two in an axial direction and also cut into four in a circumferential direction. In FIG. 1, the stator 2 is illustrated by a two-dot chain line, and the salient-pole rotor 3 is illustrated by a solid line.

Figure 2:
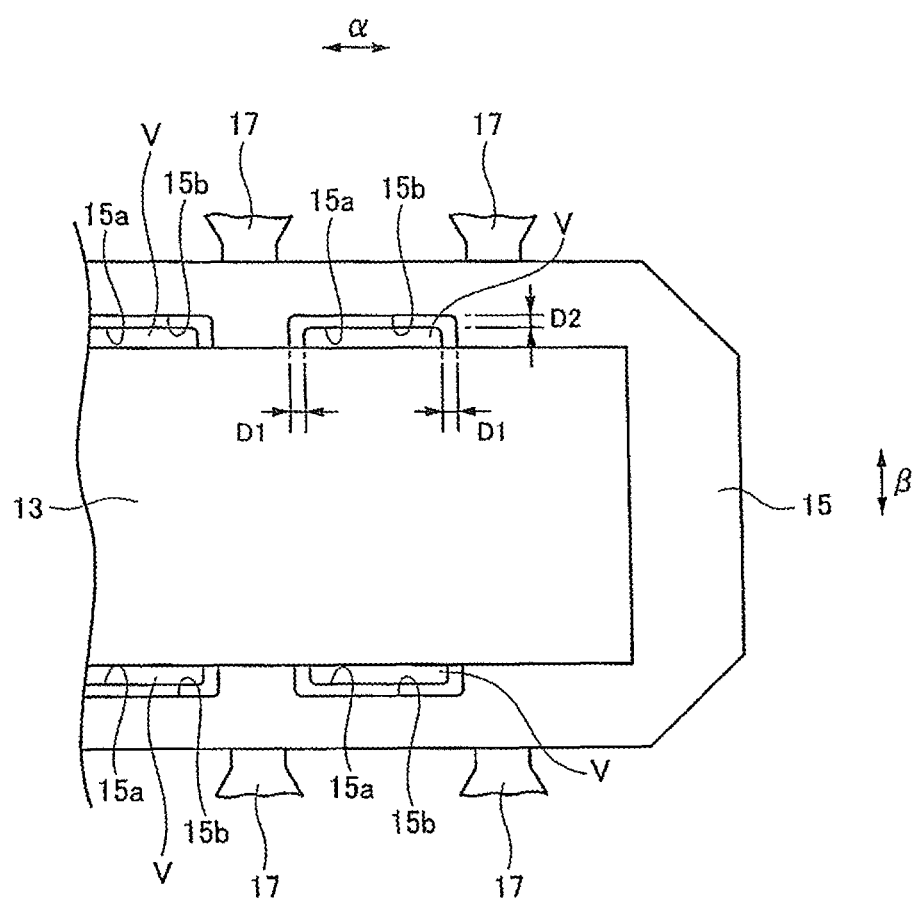
FIG. 2 is a sectional view taken along II-II of FIG. 1 with an insulation block omitted.
Figure 3:
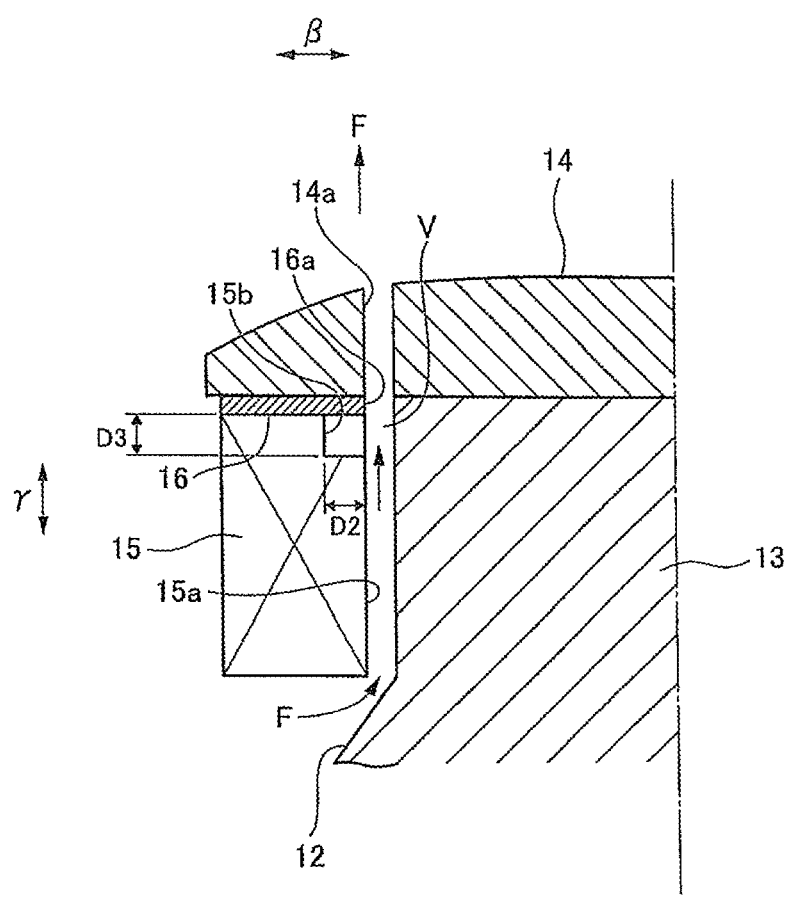
FIG. 3 is a sectional view taken along III-III of FIG. 1 with the insulation block omitted.

As shown in FIG. 1, the salient-pole rotor 3 is rotatably supported by a housing (not shown) at a radial direction inner side of the cylindrical stator 2. As shown in FIGS. 1 to 3, the salient-pole rotor 3 has a rotation shaft 11, a rotor yoke 12, magnetic cores 13, magnetic heads 14, field windings 15, insulating members 16 and coil holding members (or coil pressing members) 17.

The rotation shaft 11 is a shaft as a rotation axis of the salient-pole rotor 3. Axial direction both end portions of the salient-pole rotor 3 are rotatably supported by the housing through bearings (not shown). The rotor yoke 12 is formed integrally with the rotation shaft 11 at an axial direction middle portion of the rotation shaft 11 so as to extend along the axial direction while covering a periphery of the rotation shaft 11. Further, the plurality of magnetic cores 13 are formed integrally with the rotor yoke 12 at an outer peripheral portion of the rotor yoke 12. These magnetic cores 13 protrude outward in a radial direction from the outer peripheral portion of the rotor yoke 12, and are arranged at regular intervals in the circumferential direction.

As described above, the rotation shaft 11, the rotor yoke 12 and the magnetic cores 13 are formed integrally with each other.

The magnetic heads 14 are fixed to respective top surfaces (radial direction outer end surfaces) of the magnetic cores 13 with a plurality of bolts (not shown). A top surface (a radial direction outer end surface) of this magnetic head 14 has an arc shape along an inner peripheral surface of the stator 2, and a gap having a predetermined distance in the radial direction is provided between the top surface of the magnetic head 14 and the inner peripheral surface of the stator 2.

The field winding (a coil) 15 is wound around an outer peripheral surface of the magnetic core 13 through an insulating plate (not shown). This field winding 15 is formed by alternately stacking plate-shaped conductors and plate-shaped insulating members in the radial direction. These conductors and insulating members are supported by the rotor yoke 12 from a radial direction inner side, and also covered and held by the magnetic head 14 from a radial direction outer side. That is, the field winding 15 is sandwiched between and supported by the rotor yoke 12 (or a coil supporting member (not shown)) and the magnetic head 14 from radial direction both sides. The plate-shaped insulating member 16 is interposed between the magnetic head 14 and the field winding 15.

Here, an insulating fixing spacer (not shown) is inserted into a gap between the insulating plate (not shown) wound around the outer peripheral surface of the magnetic core 13 and the field winding 15. With the insertion of this fixing spacer, the gap between the insulating plate (not shown) and the field winding 15 is filled, and also fixation of the field winding 15 is secured.

Further, between the circumferentially adjacent field windings 15, the plurality of coil holding members 17 are provided so as to be arranged in the axial direction. These coil holding members 17 are fixed to the rotor yoke 12 with bolts 18. That is, each coil holding member 17 is tightened and fixed to the rotor yoke 12 from the radial direction outer side toward the radial direction inner side with the bolts 18 with the coil holding member 17 contacting an outer peripheral surface of the field winding 15 located at an upstream side in a rotation direction of the coil holding member 17 and contacting an outer peripheral surface of the field winding 15 located at a downstream side in the rotation direction of the coil holding member 17.

By fixing the coil holding member 17 to the rotor yoke 12 with the bolts 18 in this manner, a tightening force of the bolt 18 acts on the coil holding member 17 and also acts, as a pressing force, on the field windings 15 located at both sides in a width direction of the coil holding member 17. That is, the outer peripheral surface of the field winding 15 located at the rotation direction upstream side and the outer peripheral surface of the field winding 15 located at the rotation direction downstream side are pressed from respective circumferential direction outer sides by the coil holding member 17.

Therefore, even if a centrifugal force that occurs by and according to rotation of the salient-pole rotor 3 acts on the field winding 15, since the outer peripheral surface of the field winding 15 is pressed by the coil holding member 17, deformation or distortion (off-core or off-center of winding) of the field winding 15 due to component of force of the centrifugal force can be prevented.

Figure 4:
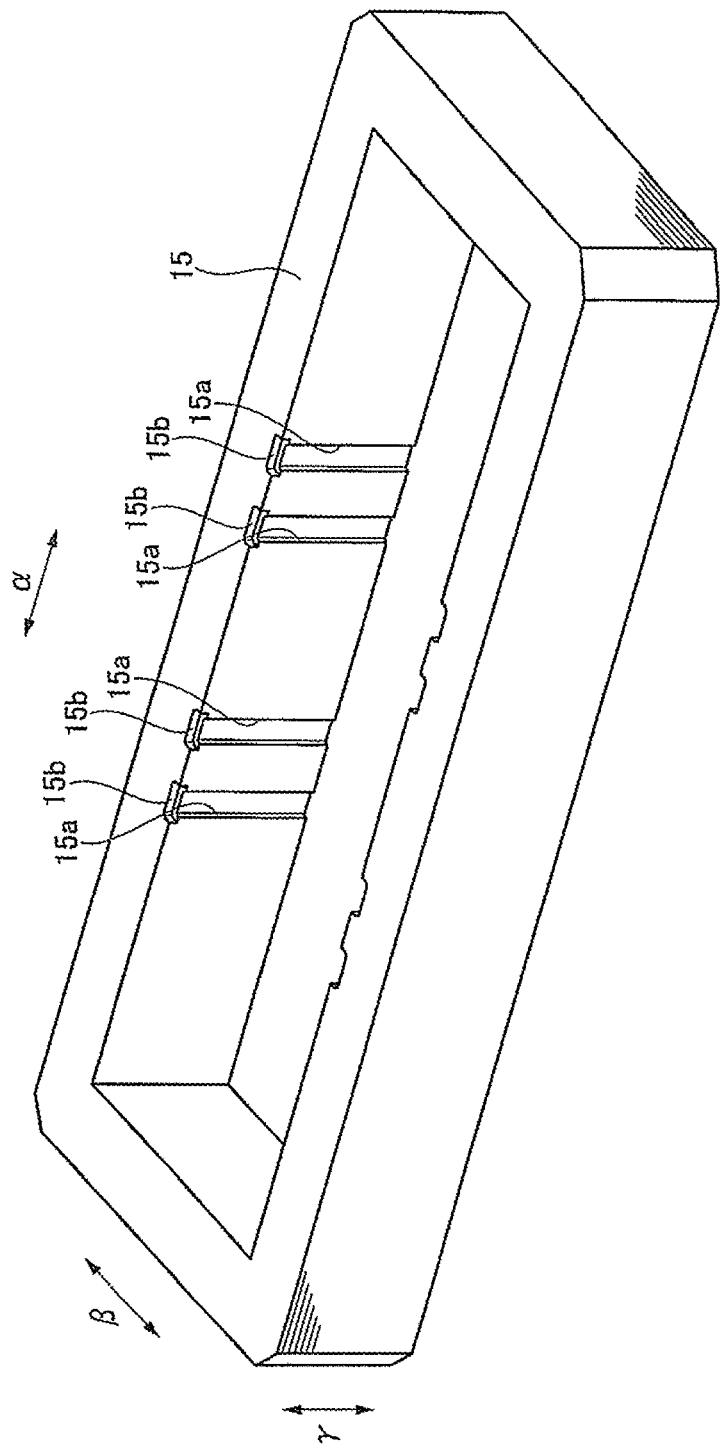
FIG. 4 is a perspective view showing a field winding.

As shown in FIGS. 2 to 4, the field winding 15 has a plurality of ventilation grooves 15a on an inner peripheral surface of the field winding 15. These ventilation grooves 15a are formed so as to open to the inner peripheral surface of the field winding 15 and penetrate the field winding 15 in the radial direction. The insulating member 16 has a plurality of cutting portions 16a corresponding to these ventilation grooves 15a. These cutting portions 16a open to an inner peripheral end surface of the insulating member 16. Further, the magnetic head 14 has a plurality of ventilation holes 14a. These ventilation holes 14a are formed so as to penetrate the magnetic head 14 in the radial direction. In addition, opening areas of the ventilation groove 15a, the cutting portion 16a and the ventilation hole 14a are equal to each other.

Furthermore, these ventilation groove 15a, cutting portion 16a and ventilation hole 14a are arranged in a straight line so as to communicate with each other in the radial direction. By the ventilation groove 15a, the cutting portion 16a and the ventilation hole 14a being connected to each other, a ventilation path V penetrating the field winding 15, the insulating member 16 and the magnetic head 14 in the radial direction is formed (see FIGS. 2 and 3). A cooling airflow F flows in this ventilation path V from the inner side to the outer side in the radial direction (from the ventilation groove 15a side to the ventilation hole 14a side). By the cooling airflow F flowing in the ventilation path V (particularly in the ventilation groove 15a formed so as to open to the inner peripheral surface of the field winding 15) in this manner, the field winding 15 can be cooled also from its inner peripheral side.

As shown in FIGS. 2 to 4, at a radial direction outer side portion of the ventilation groove 15a (a portion, at the magnetic head 14 side, of the ventilation groove 15a), a stepped portion 15b is formed by hollowing or recessing a top surface (a radial direction outer end surface) of the field winding 15 so as to surround the ventilation groove 15a (also the cutting portion 16a). The stepped portion 15b communicates with the radial direction outer side portion of the ventilation groove 15a, and faces the insulating member 16 in the radial direction. That is, the stepped portion 15b is formed such that a width of the stepped portion 15b is D1 wider than a groove width of the ventilation groove 15a and a width of the cutting portion 16a at one side in the axial direction (an α direction), a depth of the stepped portion 15b is D2 deeper than a groove depth of the ventilation groove 15a and a depth of the cutting portion 16a in the circumferential direction (a β direction), and the stepped portion 15b is hollowed or recessed by D3 from the top surface (the radial direction outer end surface) of the field winding 15 in the radial direction (a γ direction). Here, regarding the groove width (a size in the α direction) D1, the groove depth (a size in the β direction) D2 and the groove depth (a size in the γ direction) D3 of the stepped portion 15b, a part or all of these sizes could be the same, or all the sizes might be different.

Figure 5:
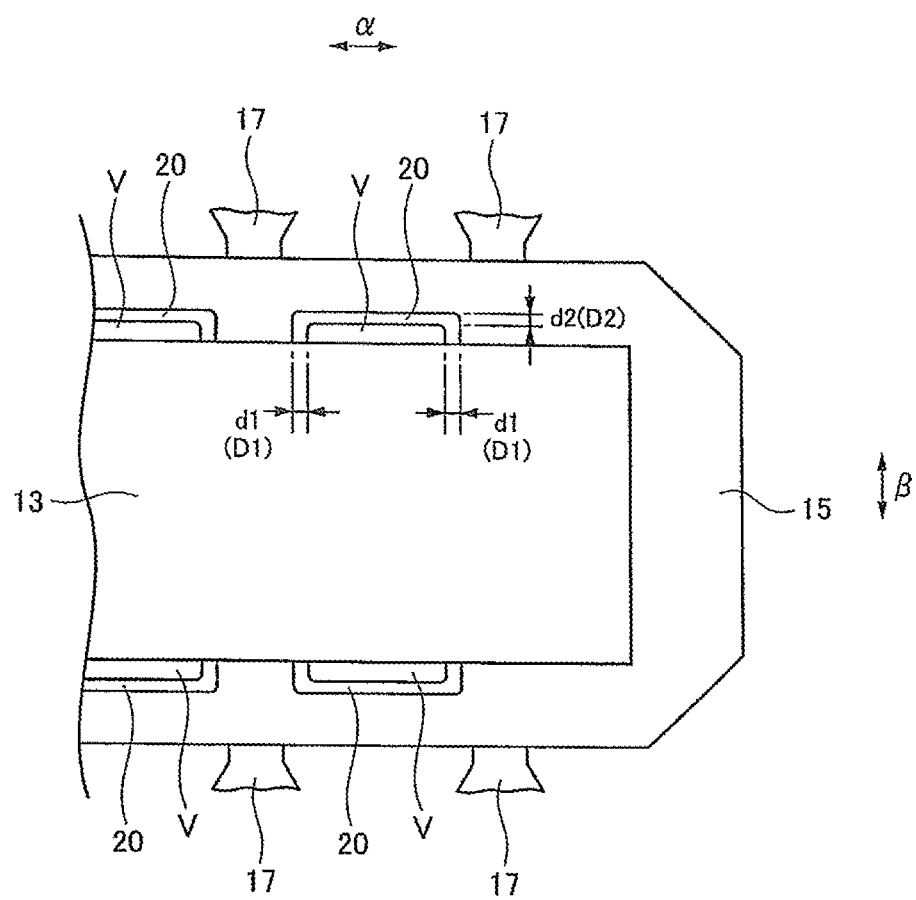
FIG. 5 is a sectional view taken along II-II of FIG. 1.
Figure 6:
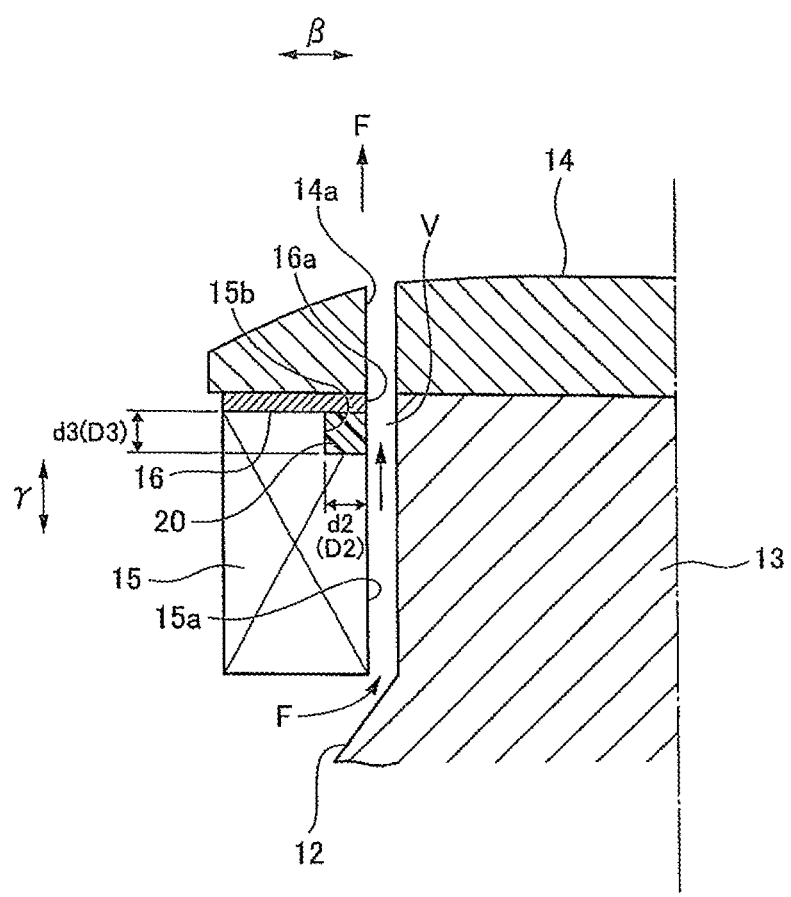
FIG. 6 is a sectional view taken along III-III of FIG. 1.
Figure 7:
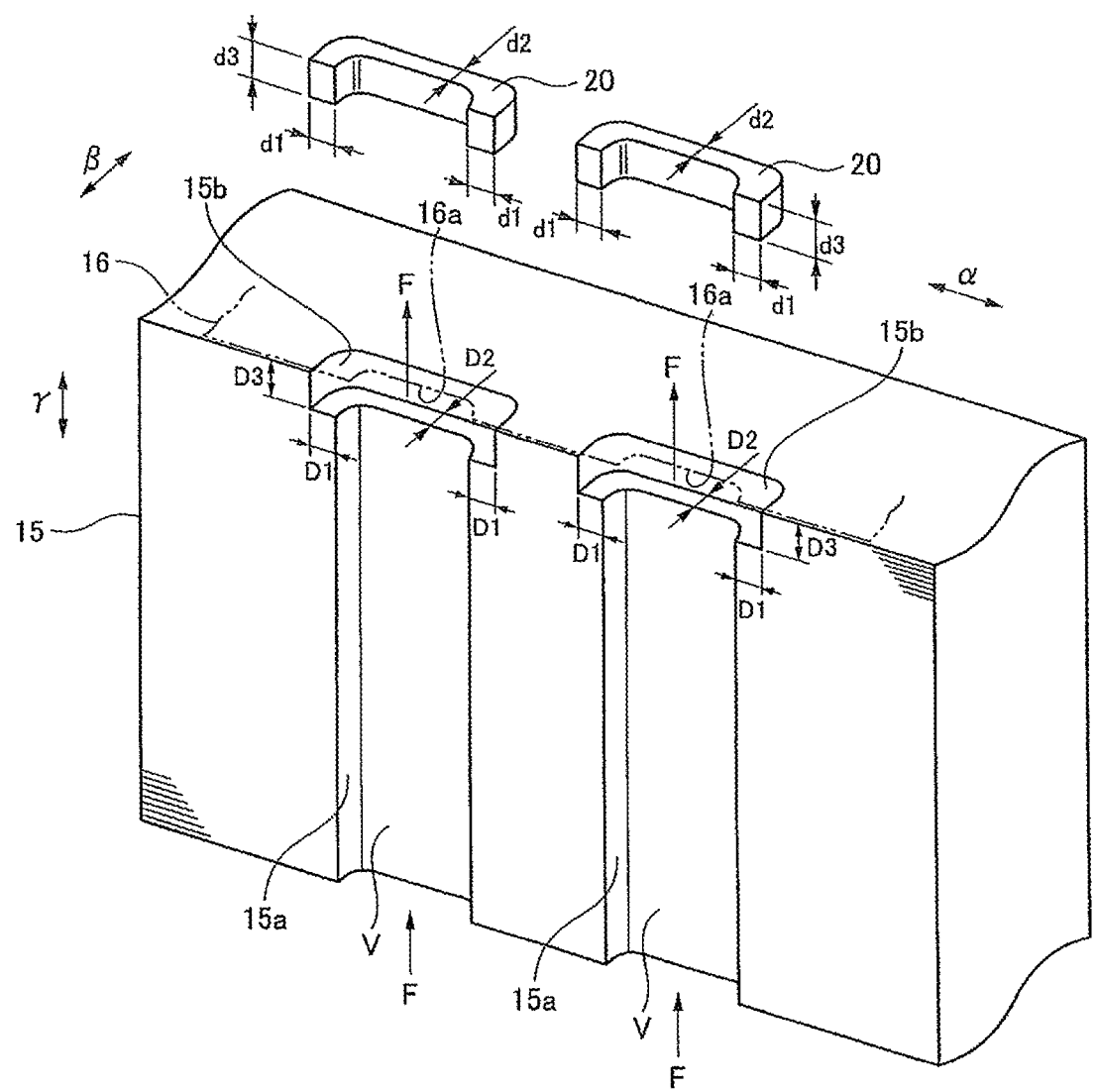
FIG. 7 is a perspective view showing a part where a ventilation groove and a stepped portion are formed at the field winding.

As shown in FIGS. 5 to 7, an insulation block 20 is fixed to the stepped portion 15b. The insulation block 20 is a square bracket-shaped member made of insulation material. The insulation block 20 is bonded (or adheres) and fixed to the stepped portion 15b, and exactly fills the stepped part ion 15b. An opening area of the insulation block 20 is the same as those of the ventilation groove 15a, the cutting portion 16a and the ventilation hole 14a. That is, an end portion width (a size of an end portion in the α direction) d1, a middle portion width (a size of a middle portion in the β direction) d2 and a height (a size in the γ direction) d3 of the insulation block 20 correspond to (are substantially the same as) the groove width D1, the groove depth D2 and the groove depth D3 of the stepped portion 15b respectively. Therefore, the insulation block 20 placed with the stepped portion 15b filled with the insulation block 20 secures the communication between the ventilation groove 15a and the ventilation hole 14a. Thus, even though the insulation block 20 is placed, the insulation block 20 does not interfere with the flow of the cooling airflow F in the ventilation path V.

By providing the stepped portion 15b at the radial direction outer side portion of the ventilation groove 15a (the portion, at the magnetic head 14 side, of the ventilation groove 15a) formed at the field winding 15, a creepage insulation distance between the field winding 15 that is a high potential member and the magnetic head 14 that is a ground potential member can be long as compared with a case where the stepped portion 15b is not provided. That is, by providing the stepped portion 15b, a long creepage insulation distance can be secured by a creepage insulation distance D1 (d1) or a creepage insulation distance D2 (d2) or a creepage insulation distance D3 (d3).

Furthermore, since the insulation block 20 is fixed to the stepped portion 15b with the stepped portion 15b filled with the insulation block 20, reliability of insulation is further improved.

INDUSTRIAL APPLICABILITY

The present invention can be utilized for a salient-pole generator and a salient-pole electric motor each having the salient-pole rotor.

EXPLANATION OF REFERENCE

1 . . . rotary electric machine
2 . . . stator
3 . . . salient-pole rotor
11 . . . rotation shaft
12 . . . rotor yoke
13 . . . magnetic core
14 . . . magnetic head
14a . . . ventilation hole
15 . . . field winding
15a . . . ventilation groove
15b . . . stepped portion
16 . . . insulating member
16a . . . cutting portion
17 . . . coil holding member
18 . . . bolt
20 . . . insulation block
D1 . . . groove width (creepage insulation distance) of stepped portion
D2 . . . groove depth (creepage insulation distance) of stepped portion
D3 . . . groove depth (creepage insulation distance) of stepped portion
d1 . . . end portion width (creepage insulation distance) of insulating member
d2 . . . middle portion width (creepage insulation distance) of insulating member
d3 . . . height (creepage insulation distance) of insulating member
F . . . cooling airflow
V . . . ventilation path

The invention claimed is:

1. An insulating structure of a ventilation path of a salient-pole rotor, the salient-pole rotor including:
a rotor yoke provided along a rotation shaft;
a plurality of magnetic cores protruding outward in a radial direction from an outer peripheral portion of the rotor yoke and arranged at regular intervals in a circumferential direction;
a magnetic head provided at a radial direction outer side of the magnetic core; and
a field winding wound around an outer peripheral surface of the magnetic core between the rotor yoke and the magnetic head,
the insulating structure of the ventilation path of the salient-pole rotor comprising:
a ventilation groove opening to an inner peripheral surface of the field winding and penetrating the field winding in the radial direction;
a ventilation hole penetrating the magnetic head in the radial direction and communicating with the ventilation groove; and
a stepped portion formed at a portion, at a magnetic head side, of the ventilation groove.

2. The insulating structure of the ventilation path of the salient-pole rotor as claimed in claim 1, further comprising:
an insulating member interposed between the magnetic head and the field winding and having a cutting portion that communicates with the ventilation groove and the ventilation hole.

3. The insulating structure of the ventilation path of the salient-pole rotor as claimed in claim 1, further comprising:
    an insulation block fixed to the stepped portion with the stepped portion filled with the insulation block and securing the communication between the ventilation groove and the ventilation hole.

\* \* \* \* \*